United States Patent Office 3,472,664

Patented Oct. 14, 1969

3,472,664

INHIBITING STARDUSTING IN ELECTROLESS COPPER PLATING

Edwin W. Bastenbeck, San Diego, Calif., and Juan Hajdu, New Haven, Conn., assignors to Enthone, Incorporated, New Haven County, Conn., a corporation of Connecticut No Drawing. Filed Sept. 15, 1966, Ser. No. 579,479

Int. Cl. C09d *5/10*; B44d *1/20*

U.S. Cl. 106—1 11 Claims

ABSTRACT OF THE DISCLOSURE

Inhibition of stardusting, i.e., the formation or occurrence of small diameter pits, in the surface of a chemical reduction copper deposit on a synthetic organic polymer surface by incorporating into the chemical reduction copper plating solution, prior to contacting the polymer surface therewith, an effective amount, sufficient to inhibit the stardusting in the copper plate or deposit, of a water-soluble polyalkylene glycol of the formula $$HO(RO)_nR'OH$$

wherein R and R′ are each ethylene, trimethylene or tetramethylene and are the same, and *n* is an integer, of 1–27. The polyalkylene glycol preferably is of molecular weight in the range of about 105–2000.

This invention relates to electroless copper plating and more especially to new and improved electroless plating solutions and method for the chemical reduction plating of copper on polymer surfaces or substrates, characterized by inhibiting stardusting in the metallic copper plate or deposit. Additionally this invention relates to new additive compositions for addition or incorporation into electroless copper plating solutions to inhibit stardusting in the metallic copper plate or deposit.

In the chemical reduction copper plating of polymer surfaces or substrates heretofore, the problem has been encountered of stardusting or fine pitting occurring in the metal plate or deposit. This fine pitting, which is present in the electroless copper deposit or plate and also in the one or more metal electroplates usually present thereover, which may be for example a copper or nickel electroplate over the electroless copper plate or deposit and a chrome electroplate over the copper or nickel electroplate, visually resembles a milky haze and with imagination the milky way galaxy and hence the name stardusting.

During the chemical reduction plating of a polymer surface or surfaces with copper, for instance an acrylonitrile-butadiene-styrene terpolymer surface or surfaces, gassing occurs at the interface of the plating solution and the polymer surface. The resultant gas bubbles adhere to small depressions or indentations on the polymer surface, such depressions or indentations being present due to, for instance, being formed during the molding of the polymer. The gas bubbles serve as a barrier or shield to the chemical reduction copper plate or deposit, with the result the sites of the gas bubbles are not copper plated and the stardusting or fine pitting is present in the metal plate of the product plated polymer article.

Stardusting may also be caused by the gas bubbles from the gassing of the chemical reduction metal plating process adhering to rough or jagged areas or to solid particulate matter on the polymer surface or substrate for instance fine particles of $Cu_2O$ on the polymer surface By the term "stardusting" as used herein is meant the formation or occurrence of fine or small diameter pits or pitting in the surface of the chemical reduction copper plate or deposit on the polymer surface due to the gassing occurring during the chemical reduction metal plating and the adherence of the resultant gas bubbles on the polymer surface as previously set forth herein, and also the occurrence or presence of the fine or small diameter pits or pitting in the surface of one or more metal electroplates that may be deposited over the chemical reduction copper plating.

One object of this invention is to provide new and improved chemical reduction copper plating solutions characterized by inhibiting stardusting in the metallic plate or deposit.

Another object is to provide a new and improved method for the chemical reduction copper plating of polymer surfaces or substrates wherein stardusting in the metallic plate or deposit is inhibited.

A further obect is to provide new and valuable additive compositions for addition to or incorporation in electroless copper plating solutions or baths to inhibit or prevent stardusting in the metallic copper plate or deposit.

In accordance with the present invention, it has been found that by adding or incorporating an effective amount of a water-soluble polyalkylene glycol, for instance a water-soluble polypropylene glycol, into the chemical reduction copper plating solution prior to the electroless plating of a polymer surface, stardusting in the metal plate or deposit is inhibited. As evidenced by the test results of Example IV hereinafter set forth, as great as an estimated about 95% elimination of the stardusting in the metal plate or deposit was attained by virtue of the addition of the polyalkylene glycol in accordance with the invention.

The term "water-soluble" is used in a broad sense herein in describing the polyalkylene glycols to include not only a polyalkylene glycol that is of good or relatively high solubility in water but also a polyalkylene glycol that is of relatively low or limited solubility in water but still sufficiently soluble in water or the plating solution to enable the polyalkylene glycol to impart stardusting inhibiting action during the chemical reduction copper plating. That portion of the polyalkylene glycol in excess of its solubility limit may be dispersed or suspended at least in part in the water or plating solution.

The chemical reduction copper plating solutions herein, in addition to the polyalkylene glycol, contain copper ions, a reducing agent for the ionic copper and a complexing agent for the copper ions.

The polyalkylene glycols herein is preferably of molecular weight in the range of about 105–2000. With molecular weights of the polyalkylene glycol much above 2000, the polyalkylene glycol tends to be too insoluble in the plating solution or bath to be effective as a stardusting inhibitor and this is the situation even when a water-solubilizing agent for the polyalkylene glycol such as ethylene glycol is present in the plating solution or bath, and with molecular weights of the polyalkylene glycol much below 105, the inhibition of stardusting is not observed.

The polyalkylene glycol is represented by the general formula:

$$HO(RO)_nR^1OH$$

wherein R and $R^1$ are each a divalent radical from the group of ethylene, trimethylene and tetramethylene radicals, and are the same, and *n* is an integer of 1 or more, preferably from 1–27, inclusive. The polyalkylene glycols herein are in general free of terminal substituents and include polyethylene glycol, polypropylene glycol and polybutylene glycol. These polyglycols are also referred to as polyalkylene oxides, and are readily obtainable in commerce. Such polyalkylene glycols may be prepared, for example, by heating the monomeric oxide, i.e., ethylene oxide, propylene oxide or butylene oxide, in the presence of a catalyst, if necessary under pressure until the polymer is formed in substantial quantity, in accordance with the procedure set forth in Staudinger, Die Hochmolekularen Organischen Verbindungen, 1932, page 287 et seq.

The polyalkylene glycol is added to the electroless copper plating solutions herein in effective amounts, sufficient to inhibit the stardusting in the metallic plate or deposit. Preferably the polyalkylene glycol is utilized in the copper plating solutions or baths herein in amount within the range of about 0.05–2 grams per liter of plating solution or bath. The polyalkylene glycol can be added separately to the already prepared electroless copper plating solution or bath or as an ingredient of an addition agent composition, or can be incorporated into the plating solution or bath by being mixed together either as such or as an ingredient of an additive agent composition with the plating solution ingredients during the formulating of the plating solution or bath, for instance by being mixed together with one or more of the ingredients of the copper salt solution or of the complexing agent solution.

Although it is not known with certainty and we do not wish to be bound thereby, one explanation advanced for the mechanism or action of the polyalkylene glycol in inhibiting stardusting herein is that the large size polyalkylene glycol molecules are preferentially adsorbed onto the small depressions or indentations in the polymer surface being plated, or onto the rough or jagged rises or protuberances or fine solid particles on the polymer surface, with the result the gas bubbles are blocked from and hence prevented from adhering to these sites. After the electroless plating, the polyalkylene glycol molecules are desorbed from the metal plated surface.

The more polyalkylene glycol incorporated into or added to the electroless copper plating bath, the greater the improvement in inhibiting or reducing stardusting. However, by the addition of the relatively large amounts of the polyalkylene glycol to the plating bath, the rate of chemical reduction copper plating is appreciably slowed or reduced. To obviate this slowing of the plating rate, a plating accelerating agent is added to the electroless plating bath to speed up or appreciably increase the rate of chemical reduction copper plating, which thereby permits the addition of the relatively large amounts of polyalkylene glycol to the electroless copper plating bath without lowering the copper plating rate to too low a value. Any material or compound that is effective to accelerate appreciably the rate of chemical reduction copper plating can be utilized as long as the material or compound is compatible in the bath. Exemplary of the plating accelerator agents are polyethanol monoamines, e.g., triethanolamine and diethanolamine, and mono- and diethylene polyamines, e.g., ethylenediamine and diethylenetriamine. The plating accelerator agent is added to the electroless copper plating bath in minor amount, sufficient or effective to accelerate or increase appreciably the chemical reduction copper plating rate, preferably from about 0.1–1 gram per liter of plating bath.

An anionic surface active wetting agent is preferably added to the electroless copper plating solution prior to the plating. Exemplary of such surfactant wetting agents, all of which are compatible in the plating bath and non-interfering with the electroless plating, are the sodium salt of sulfonated oleic acid, lauric acid sulfate, polyoxyethylenated alkyl phenols, sulfonated dodecyl diphenyl oxide and 2-ethylhexanol sulfate. The anionic wetting agent is added to the solution or baths in minor amount, sufficient to impart wettability to the solution or bath. Preferred amounts of the anionic wetting agent are from about 0.1–1 gram per liter of plating bath. Nonionic and cationic surface active wetting agents are unsatisfactory for use in the electroless copper plating solutions herein.

The electroless plating of the copper herein is carried out at a solution or bath temperature which can be room temperature, and solution temperatures above room temperature and up to about 100° F. and solution temperatures slightly below room temperature can also be utilized.

The electroless copper plating solutions or baths herein are alkaline solutions or baths, preferably of pH 10–13, more preferably pH 11.5–12.5. The pH is maintained within such ranges by addition of alkali, preferably an alkali metal hydroxide, for instance NaOH.

The copper ions are supplied in the electroless copper plating baths or solutions by being introduced therein as a water-soluble readily ionizable compound of copper, for instance as a water-soluble readily ionizable copper salt of a strong inorganic or mineral acid, e.g., cupric salts of such acid, for example cupric sulfate, cupric nitrate or cupric chloride.

Formaldehyde is the preferred reducing agent for the copper ions, and can be supplied to the plating solution or bath either as such, usually in aqueous solution, or as a compound providing formaldehyde therein, e.g., paraformaldehyde or trioxane.

Complexing agents utilizable in the electroless copper plating solutions or baths herein for complexing the copper ions are, for example, Rochelle salt, EDTA, or citric acid.

The water utilized in the solutions and baths herein is preferably pure or virtually pure water, for instance distilled or deionized water.

The electroless copper solutions which are improved upon by this invention are usually supplied in commerce as two solutions or powders, which are mixed together just prior to use. The copper salt and reducing agent, such as formaldehyde, may be in one of the solutions with the pH of the solution maintained sufficiently low and on the acid side to prevent the redox reaction, and the other solution will contain the alkali and complexing agent. In other of the formulations, the copper salt is in one solution or powder and the reducing agent in the other. Upon mixing together the two solutions or powders and water just prior to use, the reduction of the copper ions commences shortly thereafter to plate out metallic copper.

Exemplary of the copper salt solutions, complexing agent aqueous solutions, and electroless copper plating baths are the following:

COPPER SALT SOLUTION A

| | Grams per liter of water |
|---|---|
| Copper sulfate | 59 |
| Formaldehyde (37% solution) | 315 |

COMPLEXING AGENT SOLUTION A

| | Grams per liter of water |
|---|---|
| Rochelle salt | 183 |
| Sodium carbonate | 17 |
| Sodium hydroxide | 40 |

Copper salt solution A and complexing solution A and water, when mixed together in a volume ratio of 1:1:1 respectively, yields an aqueous alkaline electroless copper plating bath of the following composition:

ELECTROLESS COPPER PLATING BATH A

| | Grams per liter of water |
|---|---|
| Copper sulfate | 20 |
| Rochelle salt | 61 |
| Sodium carbonate | 6 |
| Formaldehyde (37% solution) | 105 |
| Sodium hydroxide | 13 |

Plating bath A is utilizable for plating metallic copper with good results at room temperature.

COPPER SALT SOLUTION B

| | Per liter of water |
|---|---|
| Copper sulfate ---------------------------grams-- | 90 |
| Formaldehyde (37% solution) ---------------ml-- | 90 |

CCOMPLEXING AGENT SOLUTION B

| | Grams per liter of water |
|---|---|
| Rochelle salt ---------------------------------- | 300 |
| Sodium carbonate ------------------------------ | 90 |
| Sodium hydroxide ------------------------------ | 150 |

Copper salt solution B and complexing agent solution B and water, when mixed together in a volume ratio of 1:1:1, respectively, yields an aqueous alkaline electroless copper plating bath of the following composition.

ELECTROLESS COPPER PLATING BATH B

| | Per liter of water |
|---|---|
| Copper sulfate -------------------------grams-- | 30 |
| Rochelle salt ------------------------------do-- | 100 |
| Sodium carbonate ------------------------do-- | 30 |
| Formaldehyde -----------------------------ml-- | 30 |
| Sodium hydroxide ----------------------grams-- | 50 |

Plating bath B is utilizable for plating at a bath temperature of typically about 75° F.

The polyalkylene glycol as such or in an additive agent composition is added or incorporated into electroless copper plating baths A and B to inhibit stardusting of the chemical solution metal plate or deposit.

The Rochelle salt of complexing solutions A and B and plating baths A and B is preferably a technical grade Rochelle salt which has been filtered in aqueous solution, for instance by being filtered through a column of activated carbon, to remove finely divided predominately colloidal size solid particles found to be dispersed in the solution, and apparently derived from the Rochelle salt.

The proportions of ingredients in the electroless copper plating solutions or baths which are improved upon herein can be varied over wide limits. Typically the copper plating solutions or baths herein will contain from about 3–8 grams per liter of the copper ion, from about 20–175 grams per liter of the reducing agent, such as formaldehyde, for the ionic copper, and from about 50–140 grams per liter of the complexing agent such as Rochelle salt, with the alkali present in amount sufficient to bring or adjust the pH of the solution to within the range of 10–13, inclusive.

The inhibition of stardusting in accordance with this invention achieved excellent results in the chemical reduction copper plating of surfaces or substrates of acrylonitrile-butadiene-styrene terpolymers, or "ABS" terpolymers. "ABS" terpolymers are utilized in many areas of industry and are of considerable importance in the automotive, appliance and building hardware industries. The terpolymers exhibit a good balance of properties including chemical resistance, dimensional stability, heat resistance, toughness, rigidity, dielectric properties, and ease of processing and machining. The metal-plated formed articles of such terpolymer as well as of other polymers hereafter set forth provided by this invention are utilizable, for example, as appliance housings, auto and marine hardware, plumbing fixtures, and in the building hardware industry. The polymers, the surfaces of which can be electrolessly copper plated with the inhibition of stardusting in accordance with this invention, are solid synthetic organic polymeric materials characterized by usually having normally hydrophobic surfaces and which are linear or branched and oriented or unoriented. Both synthetic organic homopolymers and copolymers and of the thermoplastic and thermosetting type are included. Exemplary of other such polymeric materials or polymers of the formed articles copper platable by this invention with inhibition of stardusting and with good results are phenolic resins, e.g., phenol-formaldehyde resins, vinyl polymers, e.g., polyvinyl chloride and polyvinylidene-styrene copolymers, polystyrenes, i.e., styrene homopolymers, styrene copolymers, e.g., styrene-acrylonitrile copolymers, and acrylic polymers, e.g., polymethyl methacrylate and methyl methacrylate-styrene copolymers. The phenolic resins can be glass fiber-filled or reinforced.

A water-solubilizing agent is preferably added to the electroless copper plating solution or bath when the polyalkylene glycol content is about 0.5 gram per liter or higher, to increase appreciably the water-solubility of the polyalkylene glycol. Any water-solubilizing agent for the polyalkylene glycol can be utilized, so long as the solubilizing agent is compatible in the plating solution or bath. Preferred solubilizing agents are the lower alkylene glycols, i.e., 2–4 C alkylene glycols, e.g., ethylene glycol, 1,2-propanediol, 1,3-propanediol and 2,3-butanediol. Among the glycols, ethylene glycol is especially preferred as the solubilizing agent. It appears the solubilizing action of the lower alkylene glycol for the polyalkylene glycol is due to the lower alkylene glycol being a solvent for the polyalkylene glycol and also being water soluble. Exemplary of other water-solubilizing agents utilizable herein for the polyalkylene glycol are butyl Cellosolve, butyl Carbitol, ethyl Cellosolve and Cellosolve acetate. The water-solubilizing agent is added to the plating solution or bath in minor amount, sufficient to increase appreciably the water-solubility of the polyalkylene glycol, preferably in amount of from about 0.05–1.0 gram per liter in the case of the lower alkylene glycol.

The polymer substrates or surfaces intended to be copper plated, if not already clean, are preferably cleaned, for instance by being chemically cleaned by immersion in an alkaline cleaner, preferably a nonsilicated alkaline cleaner. Exemplary of the alkaline cleaners are the aqueous alkaline cleaner compositions set forth hereafter:

CLEANER A

| | Grams per liter |
|---|---|
| Borax ------------------------------------------ | 30 |
| Sodium pyrophosphate ------------------------ | 30 |
| Anionic wetting agent ------------------------ | 0.2 |

CLEANER B

| | |
|---|---|
| Trisodium phosphate ------------------------- | 30 |
| Sodium pyrophosphate ------------------------ | 30 |
| Anionic wetting agent ------------------------ | 0.2 |

After cleaning, the polymer surface or substrate is rinsed wtih water. Any of the conventional anionic surfactant wetting agents readily obtainable in commerce and compatible in the cleaner can be utilized as the wetting agent in cleaners A and B.

If a mechanical roughening is to be employed in connection with the converting of the normally hydrophobic polymer surface or surfaces to a hydrophilic condition, the cleaning step may often be omitted even if the polymer surface is initially unclean as the roughening itself will effect a cleaning of the polymer surface.

The hydrophobic polymer surface or surfaces are conditioned or converted to a hydrophilic state by, for instance, immersing the article polymer surface or surfaces in a chromic acid-containing aqueous acid oxidizing solution. Exemplary of such acid oxidizing solutions are:

ACID OXIDIZING SOLUTION #1

| | Percent by wt. |
|---|---|
| $H_2SO_4$ ------------------------------------- | 40.0 |
| $H_3PO_4$ ------------------------------------- | 39.5 |
| $CrO_3$ --------------------------------------- | 3.0 |
| $H_2O$ ---------------------------------------- | 17.5 |

ACID OXIDIZING SOLUTION #2

| | |
|---|---|
| $H_2SO_4$ | 53.0 |
| $H_3PO_4$ | 22.0 |
| $CrO_3$ | 1.7 |
| $H_2O$ | 23.3 |

The sulfuric acid of such acid oxidizing solutions was 66° Bé. acid (98% $H_2SO_4$), the orthophosphoric acid was $H_3PO_4$ of 85% $H_3PO_4$ concentration, and the $CrO_3$ was commercial flake $CrO_3$. The article polymer surface or surfaces are maintained immersed in the acid oxidizing solution for a time sufficient to convert the normally hydrophobic polymer surface to a hydrophilic surface, which is receptive to the aqueous solutions utilized in the chemical reduction metal plating process and readily bondable to the metal plating by a uniform and firmly adherent bond. The acid oxidizing solution oxidizes the terpolymer surface to such an extent, that it is not only hydrophilic in condition or nature but open chemical valence bonds are actually provided on the polymer surface. These open bonds, which serve as reactive sites, provide at least in appreciable part for the firm adherence of the metal plate to the polymer surface. After such conditioning step, the polymer surface or surfaces are rinsed thoroughly with water.

The hydrophilic polymer surface or surfaces are preferably then sensitized by contacting the same with a sensitizer solution, usually by immersing the polymer surface or surfaces in the sensitizer solution. A typical aqueous sensitizer solution is:

SENSITIZER SOLUTION

| | | |
|---|---|---|
| $SnCl_2$ | g | 10 |
| HCl | ml | 40 |
| $H_2O$ | ml | 1000 |

After sensitizing, the polymer surface or surfaces are thoroughly rinsed with water.

The sensitizer polymer surface or surfaces are then activated by being contacted with an activator solution, usually by immersing the article polymer surface or surfaces therein. The following activator solution has been found to be a highly suitable activator and is exemplary of activator solutions that can be utilized:

ACTIVATOR SOLUTION

| | | |
|---|---|---|
| $PdCl_2$ | g | 1 |
| HCl | ml | 10 |
| $H_2O$ | gallon | 1 |

After activation, the polymer surface or surfaces are rinsed thoroughly with water.

Alternatively, the polymer surface can first be contacted with the activator solution followed by the sensitizer solution. The same redox reaction occurs plating out the catalytic metal.

The activated polymer surface is then electrolessly copper plated by contacting the activated surface or surfaces with the chemical reduction copper plating aqueous solution of this invention containing the polyalkylene glycol as stardusting inhibitor, for example with either of the electroless copper plating baths A or B previously set forth herein and containing the polyalkylene glycol herein as stardusting inhibitor added thereto. The contacting of the activated polymer surface or surfaces with the chemical reduction aqueous copper plating solution or bath herein is usually by immersing the activated surface or surfaces in the plating solution or bath, for a time sufficient to deposit thereon the copper metal plate or deposit. Plating is continued with the electroless metal bath until the entire or substantially entire surface of the polymer is rendered electrically conductive.

The conductive polymer surface or surfaces can then be electroplated with, for example, copper or nickel in conventional manner. This electroplating can be followed if desired, by any desired final plating, for instance chrome, nickel-chromium or nickel-gold electroplating.

The following examples further illustrate the invention but are not restrictive thereof:

Example I

A plurality of caps of acrylonitrile-butadiene-styrene terpolymer and for salt and pepper shakers were chemically cleaned by immersion in an alkaline cleaner aqueous solution of the following composition:

| | Grams per liter |
|---|---|
| Sodium hydroxide | 15 |
| Sodium carbonate | 25 |
| Trisodium phosphate | 20 |

The cleaner solution was at a temperature of 140° F. The caps, after completion of the cleaning thereof, were removed from such solution and rinsed in cold water. The cleaned caps were then conditioned by immersion in a chromic acid-containing conditioning solution at a temperature of 140° F. for 1 minute. The conditioning solution was of the following composition:

| | Percent by wt. |
|---|---|
| $H_2SO_4$ | 40.0 |
| $H_3PO_4$ | 39.5 |
| $CrO_3$ | 3.0 |
| $H_2O$ | 17.5 |

The conditioning converted the normally hydrophobic surfaces of the caps to hydrophilic surfaces. The caps were then withdrawn from the conditioning solution and sensitized by immersion in a sensitizer solution of the following composition:

| | | |
|---|---|---|
| $SnCl_2$ | g | 10 |
| HCl | ml | 40 |
| $H_2O$ | ml | 1000 |

After about 1 minute in the sensitizer solution, which was at a temperature of 80° F., the caps were removed from the solution and rinsed in water. The sensitized caps were then activated by immersion in an activator solution of the following composition:

| | | |
|---|---|---|
| $PdCl_2$ | g | 1 |
| HCl | ml | 10 |
| $H_2O$ | gallon | 1 |

After about 1 minute in the activator solution, which was at a temperature of 80° F., the caps were removed from such solution and rinsed with water.

The activated caps were then electrolessly copper plated by being immersed in a chemical reduction aqueous copper plating bath of the following composition:

| | Grams per liter |
|---|---|
| Copper sulfate | 7.3 |
| Formaldehyde (37% solution) | 39.2 |
| Rochelle salt | 57.2 |
| Sodium hydroxide | 12.8 |
| Sodium carbonate | 5.3 |

The copper sulfate was the cupric sulfate, $CuSO_4—5H_2O$. The caps were immersed in such plating bath until sufficient metallic copper was deposited or plated out thereon to render the cap surfaces electrically conductive, which required about 15 minutes of immersion therein. The plating bath was at a temperature of 80° F. during the immersing. The caps were then withdrawn from the elecroless copper plating bath, rinsed with cold water, and electroplated in a conventional acid bright copper electroplating bath for a time sufficient to deposit a copper electroplate thereon of about 0.5 mil thickness. The caps were then withdrawn from the electroplating bath, rinsed with cold water and carefully visually examined. An estimated 20–25% of the plated surface of each cap had stardusting in the copper plating.

Example II

A plurality of salt and pepper shaker caps of acrylonitrile-butadiene-styrene terpolymer were cleaned, conditioned, sensitized and activated similarly as in Example I. The caps were then electrolessly copper plated utilizing the plating conditions of temperature and time of Example I and a chemical reduction copper plating bath of the composition of that of Example I, except that 0.3 gram per liter of plating bath of polypropylene glycol of molecular weight of 400 and 0.5 gram per liter of plating bath of sulfonated dodecyl diphenyl oxide were added to the plating bath prior to immersing the caps therein. The polypropylene glycol and the sulfonated dodecyl diphenyl oxide were added to the plating bath as an additive composition comprising a mixture of such two materials. After the electroless copper plating, the caps were rinsed with cold water and electroplated with copper in the acid bright copper electroplating bath and under the plating conditions of Example I, to deposit a copper electroplate of about 0.5 mil thickness. A careful visual examination of the product plated caps from the electroplating after rinsing with cold water, showed an estimated approximately 70% less stardusting in the composite copper plating of the caps of this Example than was present in the composite copper plating of the caps of Example I.

Example III

A plurality of salt and pepper shaker caps of acrylonitrile-butadiene-styrene terpolymer were cleaned, conditioned, sensitized and activated similarly as in Example I. The caps were then electrolessly copper plated utilizing the plating conditions of time and temperature of Example I, and a chemical reduction copper plating bath of the composition of that Example I except that 0.1 gram per liter of plating bath of polypropylene glycol of molecular weight of 400 and 0.5 gram per liter of plating bath of 2-ethylhexanol sulfate were added to the plating bath prior to immersing the caps therein. The polypropylene glycol and the 2-ethylhexanol sulfate were added to the electroless plating bath as an additive composition comprising a mixture of such two ingredients. Following the electroless copper plating, the caps were rinsed with cold water and then electroplated with copper in the acid bright copper electroplating bath of and under the plating conditions of Example I, to deposit thereon a copper electroplate of about 0.5 mil thickness. The product plated caps from the electroplating, after rinsing with cold water, were carefully visually examined, and such examination showed an estimated approximately 50% less stardusting in the composite copper plating of each of these caps than was present in the composite copper plating of each of the Example I caps.

Example IV

A plurality of caps of acrylonitrile-butadiene-styrene terpolymer for salt and pepper shakers were cleaned, conditioned, sensitized and activated similarly as in Example I. The caps were then electrolessly copper plated utilizing the plating conditions of time and temperature of Example I, and a chemical reduction copper plating bath of the composition of that of Example I except that 0.1 gram per liter of plating bath of polypropylene glycol of molecular weight of 1200 and 0.5 gram per liter of plating bath of the sodium salt of sulfonated oleic acid were added to the plating bath prior to immersing the caps therein. The polypropylene glycol and the sodium salt of sulfonated oleic acid were added to the plating bath as an additive composition comprising a mixture of such two ingredients. Following the electroless copper plating, the caps were rinsed with cold water and then electroplated with copper in the acid bright copper electroplating bath and under the plating conditions of Example I to deposit thereon a copper electroplate of about 0.5 mil thickness. A careful visual examination of the product plated caps from the electroplating, after rinsing with cold water, showed an estimated approximately 70% less stardusting in the composite copper plating of each of these caps than was present in the composite copper plating of each of the Example I caps.

Example V

A plurality of salt and pepper shaker caps of acrylonitrile-butadiene-styrene terpolymer were cleaned, conditioned, sensitized and activated similarly as in Example I. The caps were then electrolessly copper plated utilizing the plating conditions of time and temperature of Example I, and a chemical reduction copper plating bath of the composition of that of Example I except that 0.1 gram per liter of lauric acid sulfate, 0.5 gram per liter of polypropylene glycol of molecular weight of 400, and 1 gram per liter of ethylene glycol as solubilizing agent for the polypropylene glycol, were separately added to the plating bath prior to immersing the caps therein. Following the electroless copper plating, the caps were rinsed with cold water and then electroplated with copper in the acid bright copper electroplating bath of and under the plating conditions of Example I, to deposit thereon a copper electroplate of about 0.5 mil thickness. The product plated caps from the electroplating, after rinsing with cold water, were carefully visually examined, and the examination showed an estimated approximately 90% less stardusting in the composite copper plating of each of these caps than was present in the composite copper plating of each of the Example I caps.

Example VI

A plurality of salt and pepper shakers of acrylonitrile-butadiene-styrene copolymer were cleaned, conditioned, sensitized and activated similarly as in Example I. The caps were then electrolessly copper plated utilizing the plating conditions of time and temperature of Example I and a chemical reduction copper plating bath of the composition of that of Example I except than 0.5 gram per liter of plating bath of polypropylene glycol of molecular weight of 400, 1 gram per liter of plating bath of ethylene glycol as solubilizing agent for the polypropylene glycol, and 0.15 gram per liter of plating bath of triethanolamine as plating accelerator were added to the plating bath prior to immersing the caps therein. The polypropylene glycol, ethylene glycol and triethanolamine were added to the plating bath as an additive composition comprising a mixture of such three ingredients. After the electroless copper plating, the caps were rinsed with cold water and then electroplated with copper in the acid bright copper electroplating bath of and under the plating conditions of Example I, to deposit thereon a copper electroplate of about 0.5 mil thickness. The product plated caps from the electroplating, after rinsing with cold water, were carefully visually examined, and such examination showed an estimated about 95% less stardusting in the composite copper plating of each of these caps than was present in the composite copper plating of each of the Example I caps.

The additive agent compositions for adding or incorporating the polyalkylene glycol into the plating solutions or baths include, for example, a mixture of the water-soluble polyalkylene glycol and an anionic surface active wetting agent, e.g., sulfonated dodecyl diphenyl oxide, 2-ethylhexanol sulfate, the sodium salt of sulfonated oleic acid, lauric acid sulfate, or polyoxyethylenated alkyl phenols, with or without an inert, i.e., nonreactive in the additive agent composition with the other ingredients therein, diluent in the mixture. The diluent is preferably utilized in all additives of this invention and can be, for instance, an inert liquid diluent, e.g., water, a water-ethanol mixture or a water-propanol mixture, or an inert solid diluent, e.g., an alkali metal sulfate or carbonate, for example sodium sulfate or sodium carbonate. The liquid diluent is preferred among the diluents. The additive compositions containing the diluent typically contain, by weight, from about 1%–6% of the polyalkylene glycol, from about 0.1%–1% of the anionic surface active wetting agent, and the balance or remainder the inert diluent (percentages based on the weight of the additive composition). The additive agent composition herein may also contain, in addition to the polyalkylene glycol and the anionic surfactant wetting agent, an accelerating agent previously disclosed herein to accelerate or speed up the copper plating rate of the chemical reduction copper plating solution or bath and/or a water-solubilizing agent to increase appreciably the water solubility of the polyalkylene glycol, for instance, a lower alkylene glycol. Such additive compositions will typically comprise, by weight, from about 1%–5% of the plating accelerating agent, and/or from about 5%–20% of the solubilizing agent, and from about 73%–92% of water, in addition to the polyalkylene glycol and anionic surfactant wedding agent (percentages based on the weight of the total additive composition).

The additive compositions herein can also comprise a mixture of the polyalkylene glycol and the plating accelerating agent, with or without the inert diluent in the mixture. Such additive compositions containing the diluent typically contain, by weight, from about 1%–6% of the polyalkylene glycol, from about 1%–5% of the plating accelerating agent, and the balance the inert diluent percentages based on the weight of the total additive composition). The additive compositions herein can also comprise a mixture of the polyalkylene glycol and the water-solubilizing agent, with or without the inert diluent in the mixture. Such additive compositions containing the diluent typically contain, by weight, from about 1%–6% of the polyalkylene glycol and from about 5%-20% of the water-solubilizing agent (percentages based on the weight of the total additive composition).

Exemplary of such additive compositions containing the polyalkylene glycol are the following:

ADDITIVE COMPOSITION A

| | Percent by wt. |
|---|---|
| Polypropylene glycol (molecular weight 1200) | 1 |
| Lauric acid sulfate | 0.1 |
| Water | 98.9 |

ADDITIVE COMPOSITION B

| | |
|---|---|
| Polypropylene glycol (molecular weight 250) | 2 |
| 2-ethylhexanol sulfate | 0.5 |
| Water | 97.5 |

ADDITIVE COMPOSITION C

| | Percent by wt. |
|---|---|
| Polyethylene glycol (molecular weight 650) | 1.5 |
| Sodium salt of sulfonated oleic acid | 0.2 |
| Water | 98.3 |

ADDITIVE COMPOSITION D

| | Percent by wt. |
|---|---|
| Polybutylene glycol (molecular weight 1000) | 1.0 |
| Lauric acid sulfate | 0.3 |
| Water | 98.7 |

ADDITIVE COMPOSITION E

| | Percent by wt. |
|---|---|
| Polyethylene glycol (molecular weight 250) | 5 |
| 2-ethylhexanol sulfate | 1 |
| Water | 94 |

ADDITIVE COMPOSITION F

| | Percent by wt. |
|---|---|
| Polybutylene glycol (molecular weight 1000) | 1.5 |
| Sulfonated dodecyl diphenyl oxide | 0.5 |
| Sodium sulfate | 98 |

ADDITIVE COMPOSITION G

| | Percent by wt. |
|---|---|
| Polypropylene glycol (molecular weight 400) | 3.0 |
| Sulfonated dodecyl diphenyl oxide | 0.4 |
| Sodium sulfate | 96.6 |

ADDITIVE COMPOSITION H

| | Percent by wt. |
|---|---|
| Polypropylene glycol (molecular weight 1200) | 2 |
| Lauric acid sulfate | 1 |
| Ethylene glycol | 10 |
| Triethanolamine | 1 |
| Water | 86 |

ADDITIVE COMPOSITION I

| | Percent by wt. |
|---|---|
| Polypropylene glycol (molecular weight 250) | 4 |
| Ethylene glycol | 10 |
| Triethanolamine | 4 |
| Water | 82 |

ADDITIVE COMPOSITION J

| | Percent by wt. |
|---|---|
| Polypropylene glycol (molecular weight 400) | 2 |
| Lauric acid sulfate | 1 |
| Ethylene glycol | 10 |
| Water | 87 |

ADDITIVE COMPOSITION K

| | Percent by wt. |
|---|---|
| Polypropylene glycol (molecular weight 1200) | 2 |
| Triethanolamine | 5 |
| Water | 93 |

ADDITIVE COMPOSITION L

| | Percent by wt. |
|---|---|
| Polypropylene glycol (molecular weight 250) | 3 |
| Ethylene glycol | 15 |
| Water | 82 |

Further, the polyalkylene glycol can be present in an additive composition comprising a mixture of the water-soluble, readily ionizable copper salt, for example, of strong inorganic or mineral acid, e.g., cupric sulfate, cupric nitrate or cupric chloride and the water-soluble polyalkylene glycol herein, with or without the inert diluent in the mixture. Such additive composition containing the diluent will typically contain, by weight, from about 2%–10% of the copper salt, from about 3%–16% of the water-soluble polyalkylene glycol, and the balance the diluent (percentages based on the weight of the total additive composition). Such additive composition may also contain formaldehyde mixed together with the other ingredients, with water as the diluent, and the pH of the resulting aqueous solution is adjusted or maintained sufficiently below pH 7 by addition of a solution-compatible acid material, for instance, sulfuric acid, such as to a pH within the range of 2-3.5, to avoid premature reduction of the copper ions to metallic copper by the formaldehyde. The formaldehyde, typically as an aqueous solution of formaldehyde of 37% formaldehyde concentration, and the water are mixed together with the other ingredients, i.e. the copper salt and polyalkylene glycol, in amounts typically, by weight, from about 20%–40% of the formaldehyde and from about 50%–70% of the water (percentages based on the weight of the total additive composition). The additive composition herein may also comprise a mixture of a compound providing formaldehyde in the electroless copper plating solution or bath, e.g., formaldehyde as such in aqueous solution, paraformaldehyde or trioxane, and the polyalkylene glycol, with or without the inert diluent in the mixture. Such additive composition containing the inert diluent will typically contain the compound providing the formaldehyde, and the polyalklylene glycol in amounts, by weight, from about 20%–40% of the compound providing the formaldehyde, from about 3%–16% of the polyalkylene glycol, and the balance the inert diluent (percentages based on the weight of the total additive composition).

The additive composition herein can also comprise a mixture of a complexing agent for ionic copper, e.g., Rochelle salt, EDTA or citric acid, and the polyalkylene glycol with or without the inert diluent in the mixture. This additive composition when containing the inert diluent will typically contain, by weight, from about 5%–20% of the complexing agent for the ionic copper, from about 3%–16% of the water-soluble polyalkylene glycol, and the balance the inert diluent (percentages based on the weight of the total additive composition). In addition to the complexing agent and polyalkylene glycol such additive composition may also contain an alkali metal carbonate and an alkali metal hydroxide, which are normal or usual ingredients of complexing agent solutions or compositions which are mixed together with the copper solutions to form the electroless copper plating baths, e.g., sodium or potassium carbonate and sodium or potassium hydroxide. The alkali metal carbonate and alkali metal hydroxide will be mixed together with the other ingredients, i.e. the complexing agent and the polyalkylene glycol, in amounts of typically, by weight, from about 1%–2% of the alkali metal carbonate and from about 1%–5% of the alkali metal hydroxide (percentages based on the weight of the total additive composition). Further, the additive agent composition herein can comprise a mixture of the water-soluble polyalkylene glycol and the alkali metal carbonate or alkali metal hydroxide, with or without the inert dilut which may be additional of the alkali metal carbonate or another of solid or liquid inert diluents previously disclosed herein. In such an additive composition containing the inert diluent, the polyalkylene glycol is typically present in amounts, by weight, from about 3%–16%, the alkali metal carbonate or hydroxide from about 1%–5%, by weight, and the balance the inert diluent (percentages based on the weight of the total additive composition).

The molecular weight of the particular polyalkylene glycol utilized as well as the nature of the other ingredient or ingredients and the proportions of same, determines whether the additive composition herein is a liquid or solid composition, or falls somewhere in between the liquid and solid state.

The additive composition herein is added to the electroless copper plating solution or bath in amount sufficient to provide in the electroless plating solution an effective amount, sufficient to inhibit stardusting in the metallic plate or deposit, or in amount sufficient to provide therein a quantity of the polyalkylene glycol within the preferred range of about 0.05–2 grams per liter of plating solution when a quantity thereof within the preferred range is desired. When the additive composition of this invention comprises a mixture of the polyalkylene glycol and one or more ingredients normally present in the copper salt-containing composition or of the complexing agent-containing composition of the electroless copper, proper allowance should be made during the formulating of the electroless copper plating solution or bath for such other ingredients or ingredient normally of the copper salt-containing composition or complexing agent-containing composition.

What is claimed is:

1. In an aqueous alkaline chemical reduction copper plating solution comprising water, copper ions, a reducing agent for the ionic copper and a complexing agent for the copper ions, the plating solution having a pH in the range of pH 10–13, the improvement which comprises having present in the copper plating solution an effective amount, sufficient to inhibit stardusting in the copper plate, of a water-soluble polyalkylene glycol of the formula $$HO(RO)_nR'OH$$

wherein R and R′ are each a divalent radical from the group consisting of ethylene, trimethylene and tetramethylene radicals and are the same, and *n* is an integer from 1–27, inclusive, said polyalkylene glycol having a molecular weight in the range of about 105–2000, and a minor amount, sufficient to accelerate appreciably the chemical reduction copper plating rate, of a plating accelerating agent selected from the group consisting of di- and triethanol monoamines and mono- and diethylene polyamines.

2. The plating solution of claim 1 wherein the polyalkylene glycol is polypropylene glycol.

3. The plating solution of claim 1 further characterized by containing an anionic wetting agent.

4. The plating solution of claim 1 characterized by having a polyalkylene glycol content of at least about 0.5 gram per liter, and also containing a minor amount, sufficient to increase appreciably the water solubility of the polyalkylene glycol, of a water-solubilizing agent selected from the group consisting of 2–4 C alkylene glycols.

5. The plating solution of claim 4 wherein the solubilizing agent is a 2–4 C alkylene glycol.

6. The plating solution of claim 1 wherein the polyalkylene glycol is present therein in amount of about 0.05–2 grams per liter of solution.

7. In the method for the chemical reduction plating of a copper deposit onto a substrate of a solid synthetic organic polymeric material by contacting a catalytically active hydrophilic surface of the substrate with an aqueous alkaline chemical reduction copper plating solution comprising water, copper ions, a reducing agent for the ionic copper and a complexing agent for the copper ions until the substrate surface is rendered electrically conductive, the plating solution having a pH in the range of pH 10–13, the improvement whereby stardusting in the copper plating is inhibited which comprises, prior to contacting the substrate surface with the chemical reduction copper plating solution, incorporating into said copper plating solution an effective amount sufficient to inhibit stardusting in the copper plating of a water-soluble polyalkylene glycol of the formula $$HO(RO)_nR'OH$$

wherein R and R′ are each a divalent radical from the group consisting of ethylene, trimethylene and tetramethylene radicals and are the same, and *n* is an integer of 1–27, said polyalkylene glycol having a molecular weight in the range of about 105–2000, and a minor amount, sufficient to accelerate appreciably the chemical reduction copper plating rate, of a plating accelerating agent selected from the group consisting of di- and triethanol monoamines and mono- and diethylene polyamines.

8. The method of claim 7 wherein the polyalkylene glycol is incorporated into the copper plating solution in amount of about 0.05–2 grams per liter of solution.

9. The method of claim 7 wherein the polyalkylene glycol is polypropylene glycol.

10. The method of claim 7 wherein the solid synthetic organic polymeric material is an acrylonitrile-butadiene-styrene terpolymer.

11. The method of claim 7 wherein the catalytically active hydrophilic polymeric material surface is obtained by converting a normally hydrophobic surface of the solid synthetic organic polymeric material to a hydrophilic surface receptive to chemical reduction copper plating process aqueous solutions, sensitizing the hydrophilic polymeric material surface, and activating the sensitized surface.

(References on following page)

References Cited

UNITED STATES PATENTS

| | | | |
|---|---|---|---|
| 2,147,415 | 2/1939 | Tucker | 204—1 |
| 2,472,393 | 6/1949 | Avallone et al. | 117—130 |
| 2,844,486 | 7/1958 | Lamar | 106—308 |
| 2,976,169 | 3/1961 | Streicher | 117—130 XR |
| 2,996,408 | 8/1961 | Lukes | 106—1 XR |
| 3,119,709 | 1/1964 | Atkinson | 117—130 XR |
| 3,202,523 | 8/1965 | Steeg | 106—271 |
| 3,301,680 | 1/1967 | Nycander | 106—271 XR |
| 3,361,580 | 1/1968 | Schneble et al. | 106—1 |
| 3,370,974 | 2/1968 | Hepfer | 106—1 XR |
| 3,392,035 | 7/1968 | Torigai et al. | 106—1 |
| 3,246,995 | 4/1966 | Moore | 106—1 |

OTHER REFERENCES

McClelland et al., "Technology of Polyethylene Glycols and Carbowax Compounds," Chemical and Engineering News, vol. 23, No. 3, February 1945, pp. 247–251.

JULIUS FROME, Primary Examiner

L. HAYES, Assistant Examiner

U.S. Cl. X.R.

117—47, 130, 138.8

PO-1050
(5/69)

UNITED STATES PATENT OFFICE
CERTIFICATE OF CORRECTION

Patent No. 3,472,664 Dated October 14, 1969

Inventor(s) Edwin W. Bastenbeck and Juan Hajdu

It is certified that error appears in the above-identified patent and that said Letters Patent are hereby corrected as shown below:

Column 1, line 67, a comma should be inserted after "substrate".

Column 2, line 29, "IV" should be --VI--.

Column 11, line 19, "wedding" should read --wetting- line 28, after "diluent" and before "percentages" insert a parenthesis --(--.

Column 13, line 34, "dilut" should read --diluent--.

SIGNED AND SEALED
MAY 12 1970

(SEAL)
Attest:

Edward M. Fletcher, Jr.
Attesting Officer

WILLIAM E. SCHUYLER, JR.
Commissioner of Patents